(12) United States Patent
Taneya et al.

(10) Patent No.: US 7,096,050 B2
(45) Date of Patent: Aug. 22, 2006

(54) PORTABLE TELEPHONE

(75) Inventors: Yuichi Taneya, Osaka (JP); Masae Morioka, Osaka (JP); Hiroomi Kashu, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/504,149

(22) PCT Filed: Feb. 28, 2003

(86) PCT No.: PCT/JP03/02400

§ 371 (c)(1),
(2), (4) Date: Aug. 20, 2004

(87) PCT Pub. No.: WO03/075544

PCT Pub. Date: Sep. 12, 2003

(65) Prior Publication Data

US 2005/0181846 A1 Aug. 18, 2005

(30) Foreign Application Priority Data

Mar. 1, 2002 (JP) .............................. 2002-056639

(51) Int. Cl.
*H04M 1/00* (2006.01)
(52) U.S. Cl. .............................. 455/575.3; 455/414.1; 455/550.1; 455/566
(58) Field of Classification Search ................ 455/566, 455/412.1–412.2, 414.1, 466, 550.1, 556.1, 455/556.2, 95, 575.1, 575.3, 575.4, 414.2, 455/414.3, 414.4; 379/433.04, 433.01, 433.11
See application file for complete search history.

(56) References Cited

U.S. PATENT DOCUMENTS

| 5,875,403 | A | | 2/1999 | Christal ...................... 455/550 |
|---|---|---|---|---|
| 5,896,575 | A | * | 4/1999 | Higginbotham et al. .... 455/566 |
| 5,933,783 | A | * | 8/1999 | Kawakami et al. ......... 455/566 |
| 6,047,196 | A | * | 4/2000 | Makela et al. ........... 455/556.1 |
| 6,141,540 | A | * | 10/2000 | Richards et al. ......... 455/575.3 |
| 6,215,474 | B1 | * | 4/2001 | Shah .......................... 345/168 |
| 6,297,945 | B1 | | 10/2001 | Yamamoto .................. 361/681 |
| 6,473,628 | B1 | * | 10/2002 | Kuno et al. ................. 455/566 |
| 6,580,488 | B1 | * | 6/2003 | Kim .......................... 349/143 |
| 6,697,083 | B1 | * | 2/2004 | Yoon .......................... 345/658 |
| 6,895,239 | B1 | * | 5/2005 | Oomori et al. ............. 455/415 |
| 6,944,481 | B1 | * | 9/2005 | Hama et al. ................ 455/566 |
| 2004/0257334 | A1 | | 12/2004 | Yajima ....................... 345/156 |

FOREIGN PATENT DOCUMENTS

EP 0 693 860 1/1996

(Continued)

OTHER PUBLICATIONS

European Search Report (cover page) dated Mar. 30, 2005.

*Primary Examiner*—Charles N. Appiah
(74) *Attorney, Agent, or Firm*—Armstrong, Kratz, Quintos, Hanson & Brooks, LLP.

(57) ABSTRACT

The present invention provides a portable telephone comprising an openable/closable casing having a display 13a, a magnetic sensor 18b for detecting whether the casing is opened or closed, and a control circuit 10. When a message is received with the casing closed, the control circuit 10 displays the contents of the received message on the display 13a. When the casing in an opening state is thereafter detected, the control circuit 10 displays on the display 13a a reply-message-preparation screen for preparing a reply message to be sent to a sender of the received message.

6 Claims, 9 Drawing Sheets

FOREIGN PATENT DOCUMENTS

| | | |
|---|---|---|
| EP | 0 801 512 | 10/1997 |
| JP | 2000-278373 | 10/2000 |
| JP | 2001-189790 | 7/2001 |
| JP | 2002-185585 | 6/2002 |
| JP | 2002-218030 | 8/2002 |
| JP | 2002-232533 | 8/2002 |
| JP | 2002-281130 | 9/2002 |
| JP | 2002-314658 | 10/2002 |
| KR | 2004-0044143 | 5/2004 |

* cited by examiner

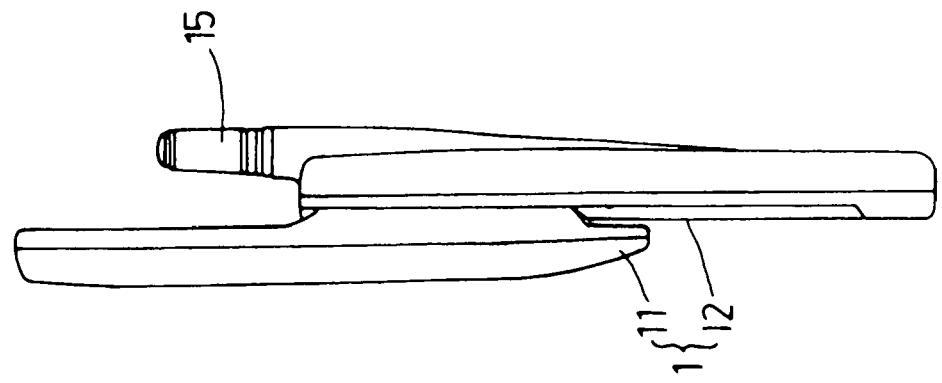
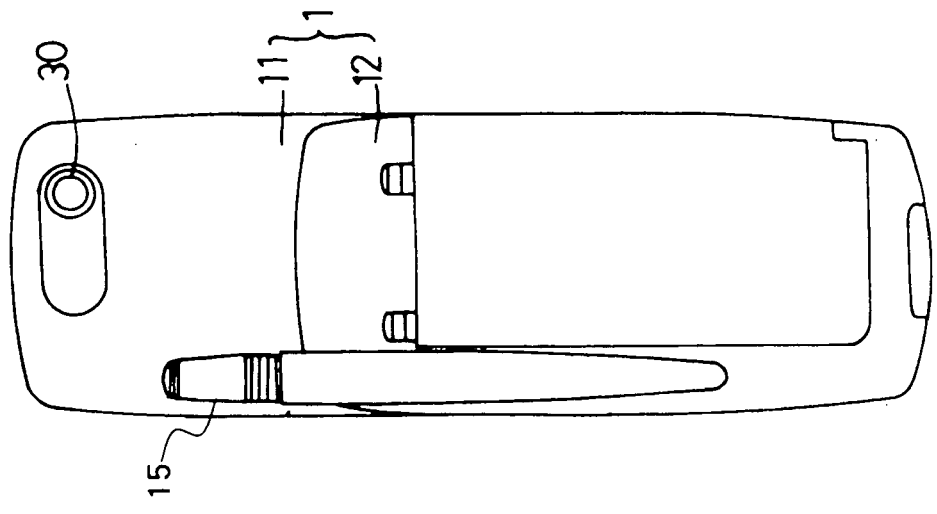
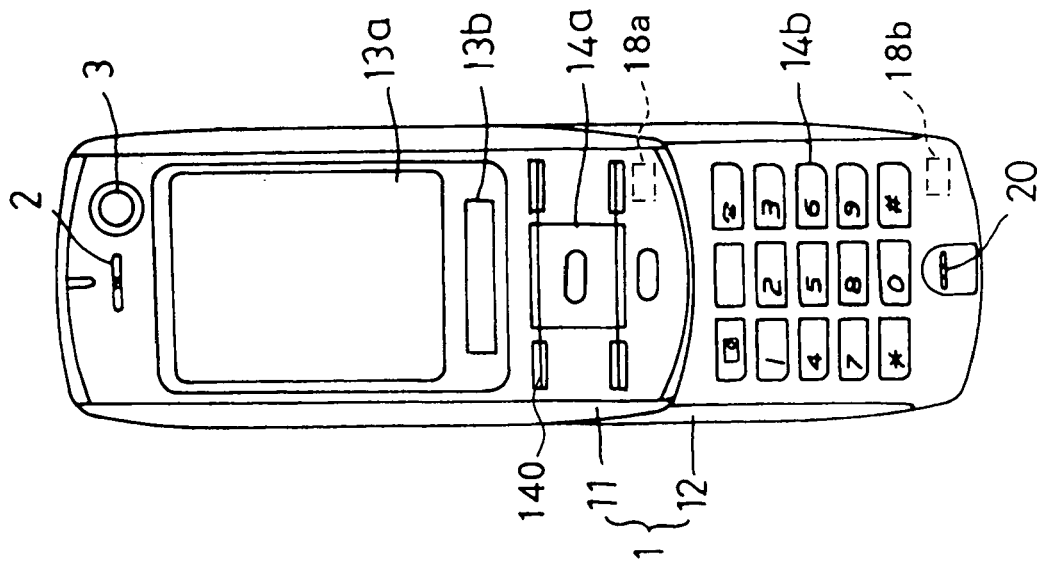
FIG.1 (a)  FIG.1 (b)  FIG.1 (c)

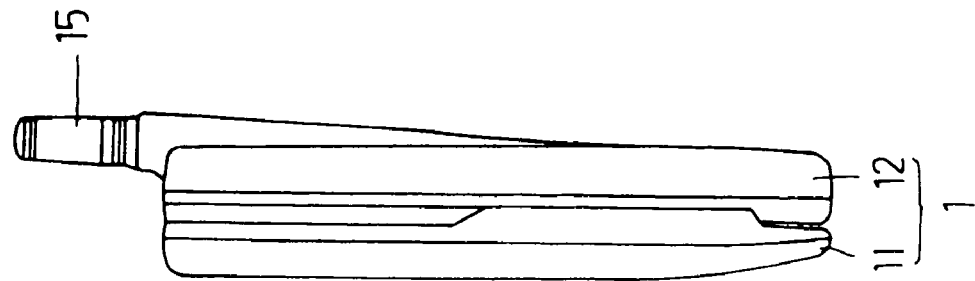
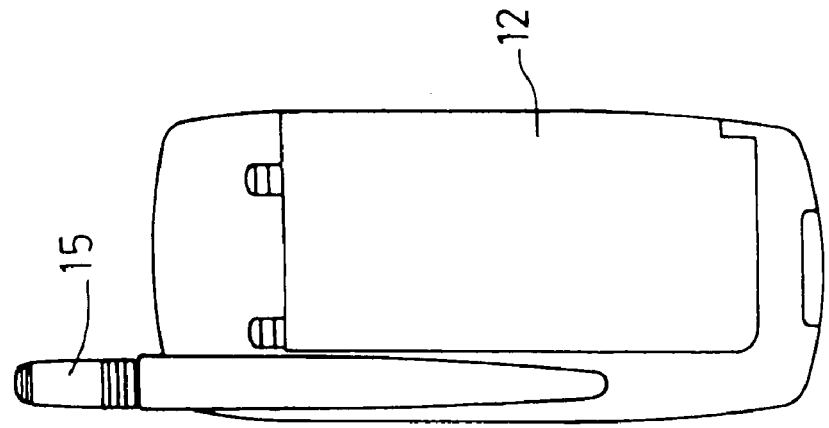
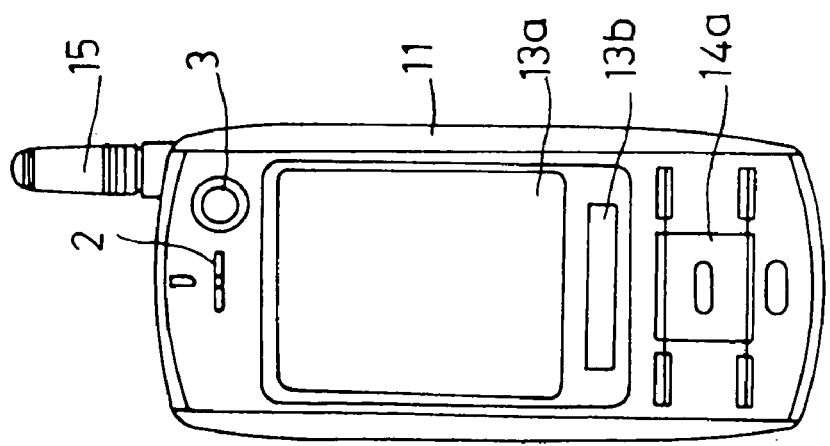

PORTABLE TELEPHONE

TECHNICAL FIELD

The present invention relates to portable telephones capable of sending and receiving a message containing electronic information, and more particularly to portable telephones which simplifies a series of manipulations of sending a reply message to a sender of a message when the message is received, or of transferring the received message to the other party than the sender.

BACKGROUND ART

A foldable portable telephone comprises an openable/closable casing. Arranged on an inner surface of the casing are a speech transmission portion and a speech reception portion, as well as a manipulation surface of a key input device and a screen of a display. When to be carried, the telephone is made compact by closing the casing. When the telephone is to send or receive signals, the manipulation surface of the key input device, the screen of the display, and the speech transmission portion and speech reception portion are exposed by opening the casing to thereby allow the user to make a call.

The portable telephones which have been in wide use in recent years have a function of sending and receiving a message. In receiving a message, the user of the foldable portable telephone having such a function opens the casing to thereby expose the manipulation surface of the key input device and the screen of the display, and thereafter manipulates a message-display key to thereby present the contents of the received message on the display. In this manner the user can read the received message.

In sending a reply message to the sender of the received message, as a first step the user manipulates a reply-message-preparation key with the contents of the received message displayed on the display as described above to present a reply-message-preparation screen on the display to thereby prepare a message to be sent by entering characters. As a last step the user manipulates a message-sending key to thereby send the prepared message to a communications equipment of the sender of the received message. In this way the user can send a reply message to the sender of the received message.

However, when the user of the conventional portable telephone sends a reply message to the sender of the received message, the user needs to perform a series of manipulations such as opening the casing, manipulating the message-display key, manipulating the reply-message-preparation key, entering characters, and manipulating the message-sending key as described above, entailing the problem of cumbersomeness of the series of manipulations.

An object of the present invention is to provide a portable telephone which more simplifies a series of manipulations of sending a message to the sender of a message when the message is received or to the other party than the sender of the received message than conventionally.

DISCLOSURE OF THE INVENTION

The present invention provides a first portable telephone including an openable/closable casing, a display having a screen which is exposed to the outside regardless of whether the casing is opened or closed, and a key input device having a plurality of manipulation keys for entering characters and a manipulation surface which is to be exposed to the outside by opening the casing. The portable telephone is capable of sending and receiving messages containing electronic information. The portable telephone is characterized in that the portable telephone comprises:

opening-closing detection means for detecting whether the casing is opened or closed, means for receiving the message, display control means for displaying the contents of the received message on the display when the message is received with the casing closed, and displaying on the display a message-preparation screen for preparing a message to be sent to a sender of the received message or to the other party than the sender when the casing in an opening state is thereafter detected.

With the first portable telephone of the present invention, when the message is received with the casing closed, the contents of the received message are displayed on the display. In this case the screen of the display is exposed to the outside with the casing closed, so that the user can read the received message.

The key input device of the portable telephone can be manipulated by opening the casing to expose the manipulation surface of the device. The user therefore opens the casing for entering characters when sending the reply message to the sender of the received message, or when transferring the message to the other party than the sender. When the contents of the received message are displayed on the display and the casing of the portable telephone is thereafter opened, the message-preparation screen will be displayed on the display. In this case the screen of the display is exposed to the outside even when the casing is opened, so that the user can view the message-preparation screen displayed on the display. Then the message is prepared in response to the user's entering characters, to send the prepared message to the sender of the received message or to the other party than the sender.

With the first portable telephone of the present invention, the message-preparation screen is displayed on the display by opening the casing as stated above, so that a series of manipulations of sending the reply message or transferring the message is made easier than that with the conventional portable telephone which requires the user to manipulate the reply-message-preparation key after opening the casing.

Stated specifically the portable telephone comprises a message-display key which is positioned so as to be manipulated with the casing closed. The display control means executes a display operation for displaying the contents of the received message when the message-display key is manipulated after the message is received.

According to the specific construction, the casing has a message-display key positioned so as to be manipulated with the casing closed. When a message is received with the casing closed, the contents of the received message can be displayed by manipulating the message-display key.

Stated further specifically, when the message-display key is manipulated after the message is received with the casing opened, the display control means displays the contents of the received message on the display and then displays the message-preparation screen on the display when the message-display key is further manipulated.

According to the above specific construction, when the message is received with the casing opened, manipulating the message-display key presents the contents of the received message on the display, and thereafter manipulating further the message-display key presents the message-preparation screen on the display.

The present invention provides a second portable telephone including an openable/closable casing, a main display having a screen which is to be exposed to the outside by opening the casing, an auxiliary display having a screen which is to be exposed to the outside with the casing closed, and a key input device having a manipulation surface which is to be exposed to the outside by opening the casing, the portable telephone being capable of sending and receiving messages containing electronic information. The portable telephone is characterized in that the portable telephone comprises:

opening-closing detection means for detecting whether the casing is opened or closed, means for receiving the message, display control means for displaying the contents of the received message on the auxiliary display when the message is received with the casing closed, and displaying on the main display a message-preparation screen for preparing a message to be sent to a sender of the received message or to the other party than the sender when the casing in an opening state is thereafter detected.

With the second portable telephone of the present invention, when the message is received with the casing closed, the contents of the received message are displayed on the auxiliary display. In this case the screen of the auxiliary display is exposed to the outside even when the casing is closed, so that the user can read the received message.

The key input device of the portable telephone can be manipulated by opening the casing to expose the manipulation surface of the device. The user therefore opens the casing for entering characters when sending the reply message to the sender of the received message, or when transferring the message to the other party than the sender. When the contents of the received message are displayed on the auxiliary display and the casing is thereafter opened, the message-preparation screen is displayed on the main display for preparing a message to be sent to the sender of the received message or to the other party than the sender. In this case the screen of the main display is exposed to the outside by opening the casing, so that the user can view the message-preparation screen displayed on the main display. Then the message is prepared in response to the user's entering characters, to send the prepared message to the sender of the received message or to the other party than the sender.

With the second portable telephone of the present invention, the message-preparation screen is displayed on the main display by opening the casing as stated above, so that a series of manipulations for sending the reply message or transferring the message is made easier than that with the conventional portable telephone which requires the user to manipulate the reply-message-preparation key after opening the casing.

Stated specifically the portable telephone comprises a message-display key which is positioned so as to be manipulated with the casing closed. The display control means executes a display operation for displaying the contents of the received message when the message-display key is manipulated after the message is received.

According to the specific construction, the casing has a message-display key positioned so as to be manipulated with the casing closed. When a message is received with the casing closed, the contents of the received message can be displayed by manipulating the message-display key.

Stated further specifically, when the message-display key is manipulated after the message is received with the casing opened, the display control means displays the contents of the received message on the main display and then displays the message-preparation screen on the main display when the message-display key is further manipulated.

According to the specific construction, when the message is received with the casing opened, manipulating the message-display key presents the contents of the received message on the main display, and thereafter manipulating further the message-display key presents the message-preparation screen on the main display.

As described above, with the portable telephone of the present invention, a series of manipulations of sending the message to the sender of the received message or to the other party than the sender is made easier than conventionally.

BRIEF DESCRIPTION OF THE DRAWINGS

FIG. 1(a) is a front view of a portable telephone in its opened state, of the first embodiment;

FIG. 1(b) is a rear view of the described portable telephone in its opened sate;

FIG. 1(c) is a side elevation of the portable telephone in its opened state;

FIG. 2(a) is a front view of the portable telephone in its closed state;

FIG. 2(b) is a rear view of the portable telephone in its closed state;

FIG. 2(c) is a side elevation of the portable telephone in its closed state;

BEST MODE FOR CARRYING OUT THE INVENTION

Figure 3:
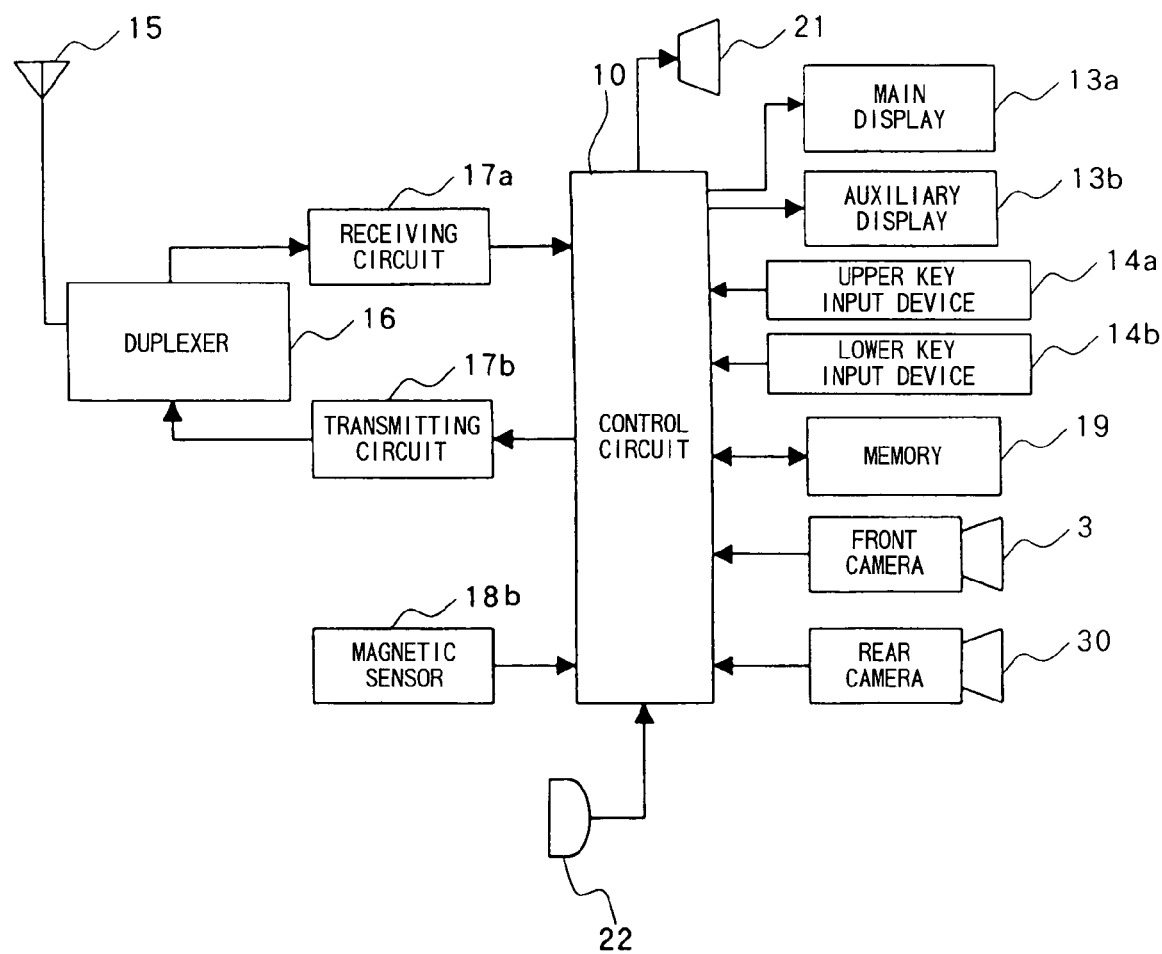
FIG. 3 is a block diagram showing the electrical construction of the portable telephone.

Embodiments for the present invention will be described specifically with reference to two embodiments.

First Embodiment

A portable telephone of the present embodiment comprises a casing 1 including an upper half case 11 and a lower half case 12, as described in FIGS. 1(a) to 1(c) and 2(a) to 2(c). The upper half case 11 and the lower half case 12 are upwardly or downwardly slidably in engagement with each other. The portable telephone is openable to a state wherein the upper half case 11 and the lower half case 12 are upwardly or downwardly shifted to each other at each of front positions thereof as shown in FIGS. 1(a) to 1(c), and closable to a state wherein the upper half case 11 and the lower half case 12 conform to each other at each of front positions thereof as shown in FIGS. 2(a) to 2(c), to thereby provide an openable/closable casing 1.

The upper half case 11 has arranged on its front surface a speech reception portion 2 housing a speaker, a main display 13a of an organic electroluminescence display, and an auxiliary display 13b of a liquid crystal display. These displays 13a, 13b are both exposed to the outside regardless of whether the casing 1 is opened or closed, so that information presented on the screen of the main display 13a and the auxiliary display 13b can be seen regardless of whether the casing is opened or closed.

The screen of the main display 13a has a large area such that text information is presented over a plurality of lines. A display operation of the main display 13a is set off in standby state in order to save power consumption, and is set on in response to the user's manipulation as will be described below, to display the contents of the received message and a message-preparation screen which will be described below.

On the other hand, the screen of the auxiliary display 13b has an extremely smaller area than that of the main display 13a, e.g., an area which is suitable for presenting text information in merely a single line. In standby state, presented on the screen of the auxiliary display 13b are date and time, a battery mark for indicating the remaining capacity of a housed secondary battery, etc., while, in receiving a message, presented thereon is a message-receiving mark for indicating the receipt of the message.

Arranged on a front surface of the upper half case 11 is an upper key input device 14a including a plurality of manipulation keys. The manipulation surface of the upper key input device 14a is exposed to the outside regardless of whether the casing 1 is opened or closed, and can be depressed not only when opened but when closed, as shown in FIG. 1(a) and FIG. 2(a). The plurality of manipulation keys providing the upper key input device 14a include a message-display key 140 to be manipulated for displaying the contents of a received message as will be described below. Furthermore, two CCD cameras 3, 30 are provided at upper ends of the front and rear surfaces, respectively, of the upper half case 11, as shown in FIG. 1. The CCD camera 3 (as will be referred to as the "front camera") which is arranged on the front surface of the upper half case 11 has a lens portion exposed to the outside regardless of whether the casing 1 is opened or closed as shown in FIG. 1(a) and FIG. 2(a), to enable the user to photograph an image not only when opened but when closed. On the other hand, the CCD camera 30 (as will be referred to as the "rear camera") which is arranged on the rear surface of the upper half case 11 has a lens portion which is exposed to the outside by opening the casing 1 as shown in FIG. 1(b), to enable the user to photograph an image only when the casing 1 is opened. Furthermore, a magnet 18a is arranged at a lower end of the upper half case 11.

Arranged on the front surface of the lower half case 12 are a speech transmission portion 20 housing a microphone and a lower key input device 14b including a plurality of manipulation keys. A manipulation surface of the lower key input device 14b is exposed by opening the casing 1 as shown in FIG. 1(a), and can be depressed only when the casing 1 is opened. The manipulation keys providing the lower key input device 14b include a plurality of numerical keys and a message-sending key to be manipulated in sending a message as will be stated below. An extending antenna 15 is provided on the rear of the lower half case 12.

A magnetic sensor 18b is provided at a lower end of the lower half case 12. The magnetic sensor 18b outputs a sensor-signal indicating "on" by moving the magnet 18a arranged at the lower end of the upper half case 11 closer to the sensor 18b while outputs a sensor signal indicating "off" by moving the magnet 18a therefrom. With reference to these sensor signals it is detected whether the casing 1 is opened or closed.

FIG. 3 shows an electrical construction of the portable telephone. As illustrated, a receiving circuit 17a and a transmitting circuit 17b are connected in parallel to a duplexer 16. Signals received by the antenna 15 are fed through the duplexer 16 to the receiving circuit 17a to demodulate speech-receiving signals or message-receiving signals. The speech-receiving signals are fed through a control circuit 10 to the speaker 21 to output voice. On the other hand, message-receiving signals are fed to the control circuit 10 to write the signals in the memory 19.

Furthermore, the speech transmitting signals input to the microphone 22 are fed through the control circuit 10 to the speech transmitting circuit 17b to modulate the signals. Message-sending signals prepared by the control circuit 10 are fed to the transmitting circuit 17b to modulate the signals. The speech transmitting signals and the message-sending signals which have been modulated are transmitted through the duplexer 16 from the antenna 15.

Connected to the control circuit 10 are the main display 13a, auxiliary display 13b, upper key input device 14a, lower key input device 14b, front camera 3, rear camera 30, and a magnetic sensor 18b, respectively.

With the portable telephone of the present invention, a simple mode for sending reply messages which simplifies the manipulation in sending a reply message to the sender of the received message can be set on/off. On the use of the portable telephone, the user sets the simple mode on or off in advance.

Figure 4:
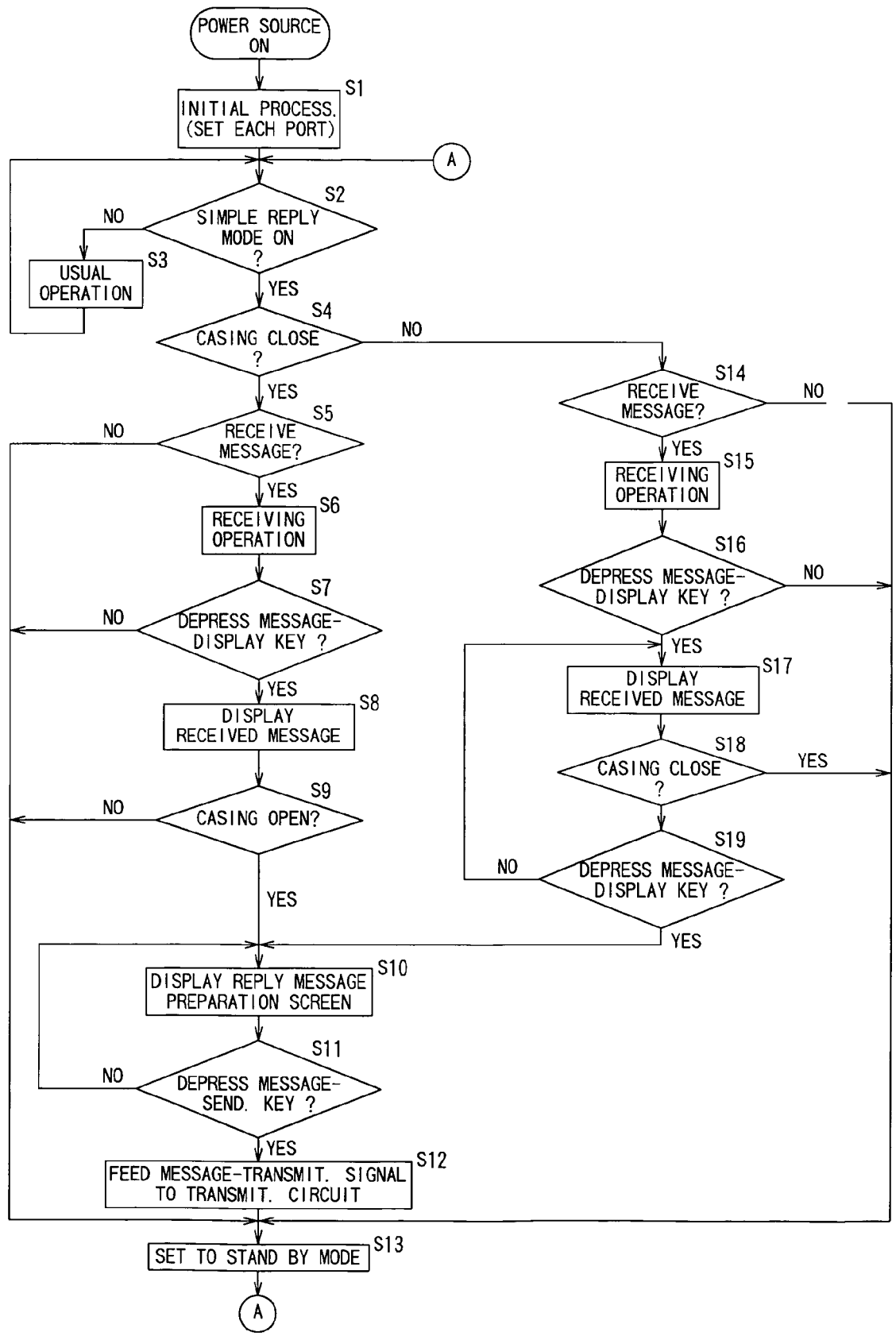
FIG. 4 is a flowchart showing a procedure of sending a reply-message to be performed by the portable telephone.

FIG. 4 shows a procedure of sending a reply message to be performed by the control circuit 10. When the power source is set on, required initial settings such as setting each port are performed in step S1. Then in step S2 an inquiry is made as to whether the simple mode for sending reply messages is set on. If the answer is negative, step S3 follows to perform a usual message-receiving operation and a reply-message-sending operation, thereafter followed by step S2.

When the answer to the inquiry of step S2 is affirmative, an inquiry is made as to whether the casing 1 is closed in step S4. If the inquiry is answered in the affirmative, the sequence proceeds to step S5 wherein an inquiry is made as to whether a message is received. On the other hand, if the inquiry is answered in the negative, the sequence proceeds to step S14 wherein an inquiry is made as to whether a message is received. If the answer to step S5 or step S14 is negative, step S13 follows to set the telephone to standby mode and to return to step S2.

Thereafter, when a message is received with the casing 1 closed, the answer to step S5 is affirmative followed by step S6 wherein the message-receiving signals are written in the memory 19, and a message-receiving mark is presented on the auxiliary display 13b while ringtone is produced for a certain period of time. Then in step S7 an inquiry is made as to whether the message-display key 140 of the upper key input device 14a is depressed. If the inquiry is answered in the negative, step S13 follows to set the telephone to standby mode to thereafter return to step S2.

On the other hand, when the message-display key 140 is depressed, the inquiry of step S7 is answered in the affirmative followed by step S8 to read out the message-receiving signals from the memory 19 and to display the contents of the received message on the main display 13*a*. Subsequently in step S9 an inquiry is made as to whether the casing 1 is opened. When the inquiry is answered in the negative, step S13 follows to set the telephone to standby mode to thereafter return to step S2.

When the casing 1 is opened with the contents of the received message displayed on the main display 13*a*, the inquiry of step S9 is answered in the affirmative followed by step S10 to display on the main display 13*a* a message-preparation screen for preparing a reply message to be sent to a sender of the received message. In this state the user's entering characters with the lower key input device 14*b* prepares a message to be sent in conformity with the user's entering manipulation.

Thereafter, in step S11, an inquiry is made as to whether a message-sending key of the lower key input device 14*b* is depressed. If the inquiry is answered in the negative, the sequence returns to step S10. On the other hand if in the affirmative, step S12 follows to feed prepared message-sending signals to the transmitting circuit 17*b*. Accordingly message-sending signals are sent to a communications equipment of the sender of the received message. As a last step the telephone is set to standby mode in step S13 to thereafter return to step S2.

Thereafter, when a message is received with the casing 1 opened, the answer to step S14 is affirmative followed by step S15 wherein the message-receiving signals are written in the memory 19, and a message-receiving mark is presented on the auxiliary display 13*b* while ringtone is produced for a certain period of time. Then in step S16 an inquiry is made as to whether the message-display key 140 of the upper key input device 14*a* is depressed. If the inquiry is answered in the negative, step S13 follows to set the telephone to standby mode to thereafter return to step S2.

On the other hand, when the message-display key 140 is depressed, the inquiry of step S16 is answered in the affirmative followed by step S17 to read out the message-receiving signals from the memory 19 displaying the contents of the received message on the main display 13*a*. Subsequently in step S18 an inquiry is made as to whether the casing 1 is closed. When the inquiry is answered in the affirmative, step S13 follows to set the telephone to standby mode to thereafter return to step S2. On the other hand, the inquiry of step S18 is answered in the negative, step S19 follows to inquire whether the message-display key 140 of the upper key input device 14*a* is depressed. If the answer is negative, the sequence returns to step s17. On the other hand if the answer is affirmative, step S10 follows to display the reply message-preparation screen on the main display 13*a*. Thereafter the procedures of step S11 to step S13 as described are performed to thereafter return to step S2.

According to the procedures described, in the case where the simple mode for sending reply messages is set on, when a message is received with the casing 1 closed, the message-receiving mark is presented on the auxiliary display 13*b* while ringtone is produced for a certain period of time. Thereafter, when the message-display key 140 of the upper key input device 14*a* is depressed, the contents of the received message are displayed on the main display 13*a*. Subsequently opening the casing 1 presents the reply message-preparation screen on the main display 13*a*. In this state, entering characters prepares a message to be sent in conformity with the entering manipulation. Thereafter, when the message sending key of the lower key input device 14*b* is depressed, prepared message-sending signals are sent to the communications equipment of the sender of the received message.

On the other hand, when a message is received with the casing 1 opened, the message-receiving mark is presented on the auxiliary display 13*b* while ringtone is produced for a certain period of time. Thereafter, when a message-display key 140 of the upper key input device 14*a* is depressed, the contents of the received message are displayed on the main display 13*a*. When the message-display key 140 is depressed, the reply message-preparation screen is displayed on the main display 13*a*. In this state, entering characters prepares the message to be sent in conformity with the entering manipulation. Thereafter, when the message-sending key of the lower key input device 14*b* is depressed, prepared message-sending signals are sent to the communications equipment of the sender of the received message. On the other hand, when the casing 1 is closed with the contents of the received message displayed on the main display 13*a* as described above, the telephone returns to its standby mode. Even if the contents of the prepared reply message or those of the received message are displayed on the main display 13*a* and the casing 1 is then closed, the contents are still held displayed.

With the portable telephone of the present embodiment, when the simple mode for sending reply messages is set on, the user will perform procedures to be described below in sending the reply message to the sender of the received message after reading the received message.

When the message is received with the casing 1 closed, the contents of the received message are displayed on the main display 13*a* by depressing the message-display key 140 of the upper key input device 14*a*. Incidentally, the display surface of the main display 13*a* is exposed to the outside with the casing 1 closed as shown in FIG. 2(*a*), so that the user can read the received message displayed on the main display 13*a*. Subsequently when the user opens the casing 1 for exposing the manipulation surface of the lower key input device 14*b*, reply-message-preparation screen is displayed on the main display 13*a*. The display surface of the main display 13*a* is exposed to the outside even when the casing 1 is opened as shown in FIG. 1(*a*), so that the user can view the reply-message-preparation screen on the main display 13*a*. The user then prepares the reply message by entering characters with the plurality of manipulation keys of the lower key input device 14*b*. As a last step the prepared message-sending signals are transmitted to the communications equipment of the sender of the received message by depressing the message-sending key of the lower key input device 14*b*. Accordingly the user can send the reply message to the sender of the received message.

On the other hand, when the message is received with the casing 1 opened, the contents of the received message are displayed on the main display 13*a* by depressing the message-display key 140 of the upper key input device 14*a*. Incidentally, the display surface of the main display 13*a* is exposed to the outside with the casing 1 opened as shown in FIG. 1(*a*), so that the user can read the received message displayed on the main display 13*a*. Subsequently the reply-message-preparation screen is displayed on the main display 13*a* by depressing again the message-display key 140 of the upper key input device 14*a* with the contents of the received message displayed on the main display 13*a*. The user then prepares the reply message by entering characters with the plurality of manipulation keys of the lower key input device 14*b*. As a last step the prepared message-sending signals are transmitted to the communications equipment of the sender of the received message by depressing the message-sending key of the lower key input device 14b. Accordingly the user can send the reply message to the sender of the received message.

With the portable telephone of the present embodiment, in the case where the simple mode for sending reply messages is set on, the reply-message-preparation screen will be displayed on the main display 13a by opening the casing 1 as described above when the message is received with the casing 1 closed. A series of manipulations for sending the reply message to the sender of the received message is made easier than that with the conventional portable telephone which requires the user to manipulate the reply-message-preparation key after opening the casing.

Furthermore, the user can read the received message with the casing 1 closed by merely manipulating the message-display key 140 as stated above. The manipulations for reading the received message are made easier than those with the conventional portable telephone which requires the user to open the casing for reading the received message.

Second Embodiment

Figure 5:
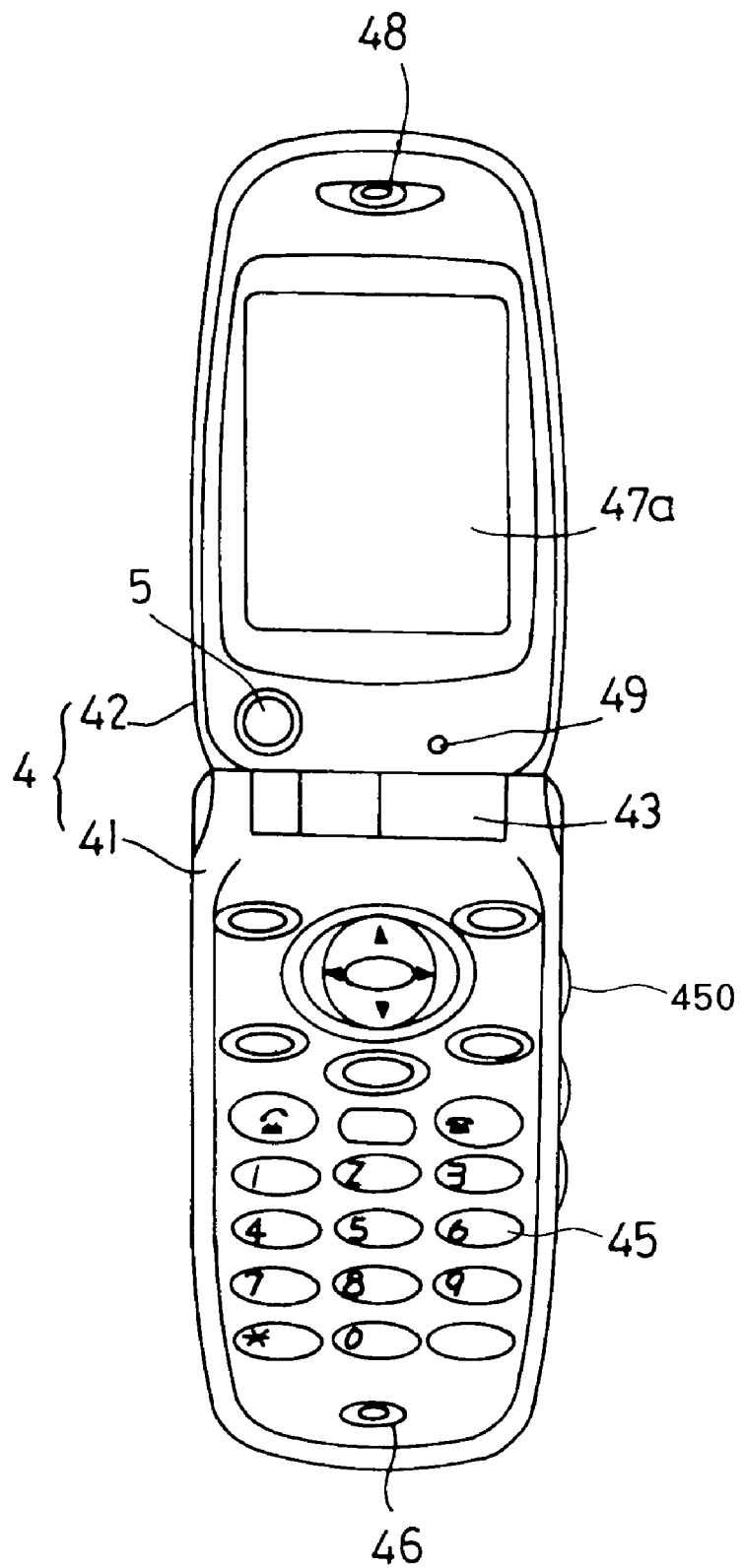
FIG. 5 is a front view of a portable telephone in its opened state, of the second embodiment.
Figure 6:
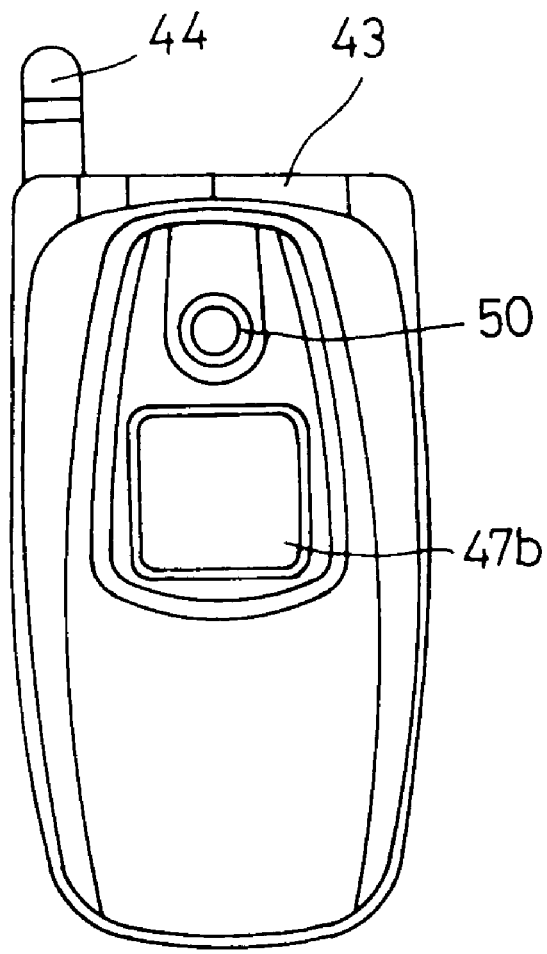
FIG. 6(a) is a front view of the described portable telephone in its closed state.
FIG. 6(b) is a side elevation of the portable telephone in its closed state.
Figure 6:
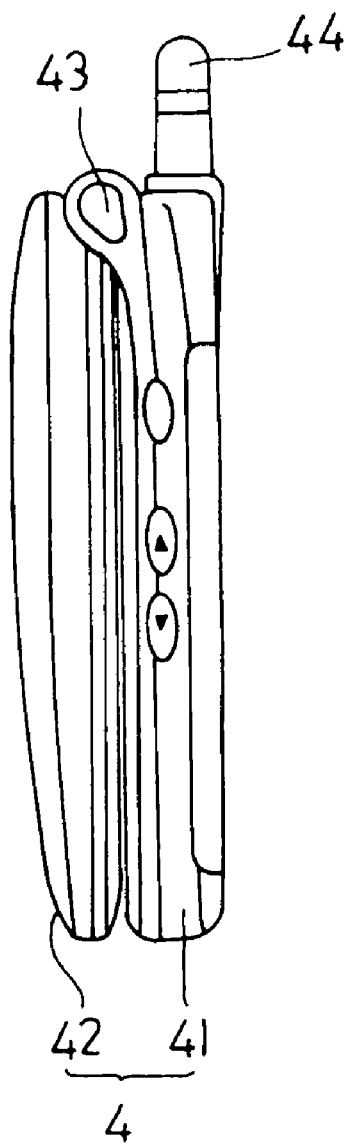

The portable telephone of the present embodiment comprises a flat main body case 41 and a lid case 42 as shown in FIGS. 5 and 6. An upper end of the main body case 41 and a lower end of the lid case 42 are connected to each other by a hinge mechanism 43. The telephone can be opened to a state wherein the lid case 42 is opened as shown in FIG. 5 and closed to a state wherein the lid case 42 is closed as shown in FIG. 6, to thereby provide a foldable casing.

Arranged on the front surface of the main body case 41 are a speech transmission portion 46 housing a microphone and a key input device 45 including a plurality of manipulation keys. A manipulation surface of the key input device 45 is exposed to the outside by opening the casing 4 as shown in FIG. 1, and can be depressed only in the opening state of the casing 4. The manipulation keys providing the key input device 45 include a plurality of numerical keys and a message-sending key to be manipulated in sending a message as will be stated below. An extending antenna 44 is provided on the rear of the main body case 41. The main body case 41 has at a side thereof a message-display key 450 which is to be manipulated for displaying the contents of the received message. The key 450 is exposed to the outside regardless of whether the casing 4 is opened or closed as shown in FIGS. 5 and 6. The key can be depressed not only when the casing 4 is opened but when closed.

The lid case 42 has arranged on its front surface a speech reception portion 48 housing a speaker and a main display 47a comprising a liquid crystal display as shown in FIG. 5. The display surface of the main display 47a is exposed to the outside by opening the casing 4 as shown in FIG. 5. Only when the casing 4 is opened, the user can view the information displayed on the main display 47a. The display surface of the main display 47a has a large area such that text information can be presented over a plurality of lines. The contents of the received message and the message-reply preparing screen are displayed on the display surface. Arranged on the front surface of the lid case 42 is an opening-closing detection switch 49 for detecting whether the lid case 42 is opened or closed. Closing the lid case 42 turns on the opening-closing detection switch 49 while opening the lid case 42 turns off the switch 49. Arranged on the front surface of the lid case 42 is a CCD camera 5 which has a lens portion exposed to the outside by opening the casing 4. The user can photograph an image only when the casing 4 is opened.

The lid case 42 has arranged on its rear surface an auxiliary display 47b comprising a liquid crystal display as shown in FIG. 6. The display surface of the auxiliary display 47b is exposed to the outside even when the casing 4 is closed. Information presented on the auxiliary display 47b can be seen even when the casing 4 is closed. The display surface of the auxiliary display 47b has a large area such that text information can be presented over a plurality of lines. The display operation of the auxiliary display 47b is set on only when the casing 4 is closed. In standby state, date and battery mark, etc., are presented thereon. When a message is received, a message-receiving mark is presented thereon and the contents of the received message are also displayed as will be stated below. The lid case 42 further has arranged on its rear surface a CCD camera 50, which has a lens portion exposed to the outside regardless of whether the casing 4 is opened or closed as shown in FIGS. 5 and 6. The user can photograph an image regardless of whether opened or closed.

Figure 7:
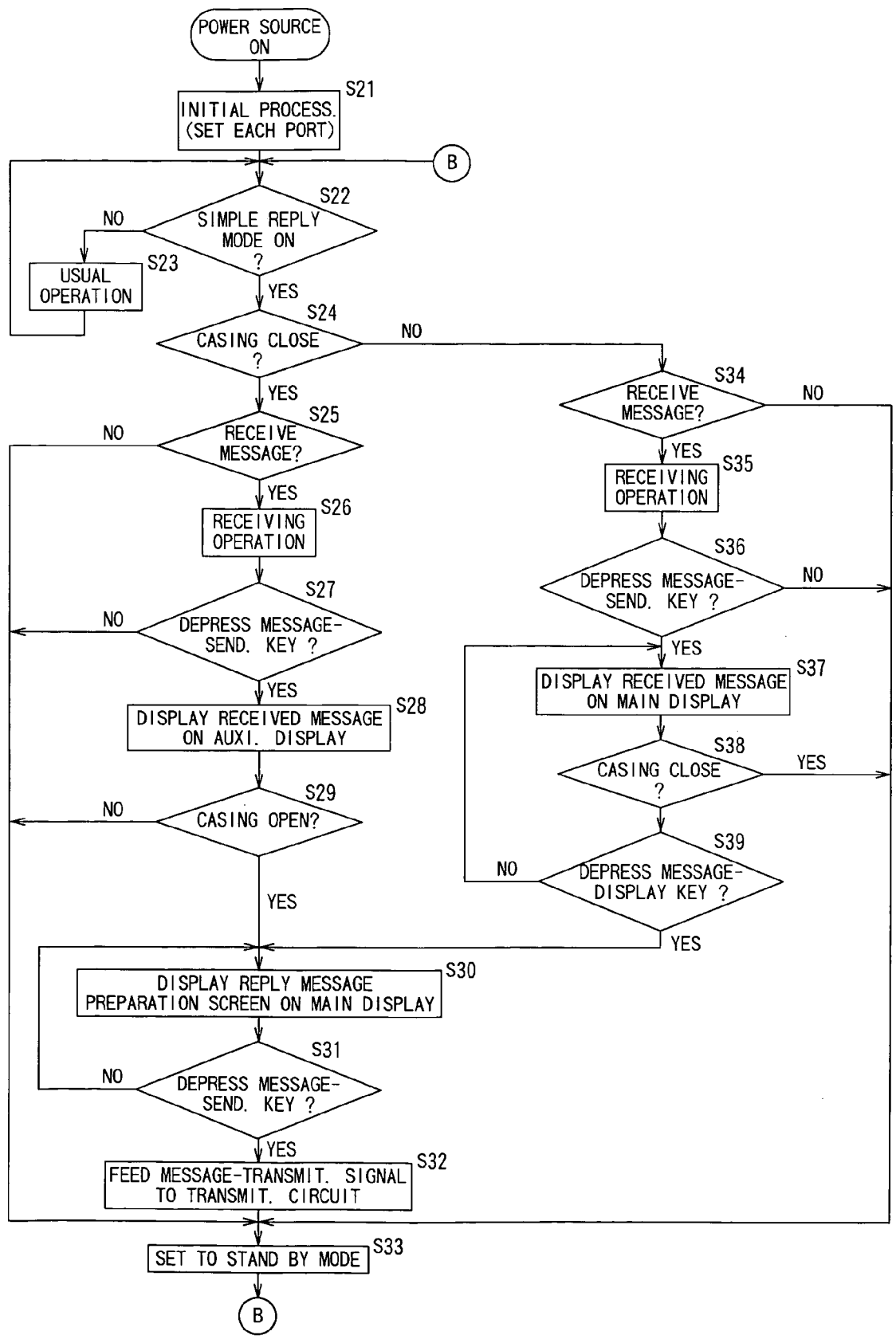
FIG. 7 is a flowchart showing a procedure of sending a reply-message to be performed by the portable telephone.

FIG. 7 shows a procedure of sending a reply message to be performed by a control circuit of the present embodiment. When the power source is set on, required initial settings such as setting each port are performed in step S21. Then in step S22 an inquiry is made as to whether the simple mode for sending reply messages is set on. If the answer is negative, step S23 follows to perform a usual message-receiving operation and a reply-message-sending operation, thereafter followed by step S22.

When the answer to the inquiry of step S22 is affirmative, an inquiry is made as to whether the casing 4 is closed in step S24. If the inquiry is answered in the affirmative, the sequence proceeds to step S25 wherein an inquiry is made as to whether a message is received. On the other hand, if the inquiry is answered in the negative, the sequence proceeds to step S34 wherein an inquiry is made as to whether a message is received. If the answer to step S25 or step S34 is negative, step S33 follows to set the telephone to standby mode and to return to step S22.

Thereafter, when a message is received with the casing 4 closed, the answer to step S25 is affirmative followed by step S26 wherein the message-receiving signals are written in a memory, and a message-receiving mark is presented on the auxiliary display 47b while ringtone is produced for a certain period of time. Then in step S27 an inquiry is made as to whether the message-display key 450 is depressed. If the inquiry is answered in the negative, step S33 follows to set the telephone to standby mode to thereafter return to step S22.

On the other hand, when the message-display key 450 is depressed, the inquiry of step S27 is answered in the affirmative followed by step S28 to read out the message-receiving signals from the memory and to display the contents of the received message on the auxiliary display 47b. Subsequently in step S29 an inquiry is made as to whether the casing 4 is opened. When the inquiry is answered in the negative, step S33 follows to set the telephone to standby mode to thereafter return to step S22.

When the casing 4 is opened with the contents of the received message displayed on the auxiliary display 47b, the inquiry of step S29 is answered in the affirmative followed by step S30 to display on the main display 47a a message-preparation screen for preparing a reply message to be sent to the sender of the received message. In this state the user's entering characters with the key input device 45 prepares a message to be sent in conformity with the user's entering manipulation.

Thereafter, in step S31, an inquiry is made as to whether a message-sending key of the key input device 45 is depressed. If the inquiry is answered in the negative, the sequence returns to step S30. On the other hand if in the affirmative, step S32 follows to feed prepared message-sending signals to the transmitting circuit. Accordingly message-sending signals are sent to a communications equipment of the sender of the received message. As a last step the telephone is set to standby mode in step S33 to thereafter return to step S22.

Thereafter, when a message is received with the casing 4 opened, the answer to step 34 is affirmative followed by step S35 wherein the message-receiving signals are written in the memory, and a message-receiving mark is presented on the auxiliary display 47b while ringtone is produced for a certain period of time. Then in step S36 an inquiry is made as to whether the message-display key 450 is depressed. If the inquiry is answered in the negative, step S33 follows to set the telephone to standby mode to thereafter return to step S22.

On the other hand, when the message-display key 450 is depressed, the inquiry of step S36 is answered in the affirmative followed by step S37 to read out the message-receiving signals from the memory to display the contents of the received message on the main display 47a. Subsequently in step S38 an inquiry is made as to whether the casing 4 is closed. When the inquiry is answered in the affirmative, step S33 follows to set the telephone to standby mode to thereafter return to step S22.

On the other hand, the inquiry of step S38 is answered in the negative, step S39 follows to inquire whether the message-display key 450 is depressed. If the answer is negative, the sequence returns to step S37. On the other hand if the answer is affirmative, step S30 follows to display the reply message-preparation screen on the main display 47a. Thereafter the procedures of step S31 to step S33 as described are performed to return to thereafter step S22.

According to the procedures described, in the case where the simple mode for sending reply messages is set on, the message-receiving mark is presented on the auxiliary display 47b while ringtone is produced for a certain period of time when the message is received with the casing 4 closed. Thereafter, when the message-display key 450 is depressed, the contents of the received message are displayed on the auxiliary display 47b. Subsequently opening the casing 4 presents the reply message-preparation screen on the main display 47a. In this state the user's entering characters prepares a message to be sent in conformity with the entering manipulation. Thereafter, when the message sending key of the key input device 45 is depressed, prepared message-sending signals are sent to the communications equipment of the sender of the received message.

When a message is, on the other hand, received with the casing 4 opened, the message-receiving mark is presented on the main display 47a while ringtone is produced for a certain period of time. Thereafter, when a message-display key 450 is depressed, the contents of the received message are displayed on the main display 47a. When the message-display key 450 is further depressed, the reply message-preparation screen is displayed on the main display 47a. In this state the user's entering characters prepares the message to be sent in conformity with the entering manipulation. Thereafter, when the message-sending key of the key input device 45 is depressed, prepared message-sending signals are sent to the communications equipment of the sender of the received message. On the other hand, when the casing 4 is closed with the contents of the received message displayed on the main display 47a as described above, the telephone returns to its standby mode. Even if the contents of the prepared reply message or those of the received message are displayed on the main display 47a and the casing 4 is then closed, the contents are still held displayed.

With the portable telephone of the present embodiment, when the simple mode for sending reply messages is set on, the user will perform procedures to be described below in sending the reply message to the sender of the received message after reading the received message.

When the message is received with the casing 4 closed, the contents of the received message are displayed on the auxiliary display 47b by depressing the message-display key 450. Incidentally, the display surface of the auxiliary display 47b is exposed to the outside with the casing 4 closed as shown in FIG. 6, so that the user can read the received message displayed on the auxiliary display 47b. Subsequently when the user opens the casing 4 for exposing the manipulation surface of the key input device 45, reply-message-preparation screen is displayed on the main display 47a. The display surface of the main display 47a is exposed to the outside by opening the casing 4 as shown in FIG. 5, so that the user can view the reply-message-preparation screen on the main display 47a. The user then prepares the reply message by entering characters with the plurality of manipulation keys of the key input device 45. As a last step the prepared message-sending signals are transmitted to the communications equipment of the sender of the received message by depressing the message-sending key of the key input device 45. Accordingly the user can send the reply message to the sender of the received message.

On the other hand, when the message is received with the casing 4 opened, the contents of the received message are displayed on the main display 47a by depressing the message-display key 450. Incidentally, the display surface of the main display 47a is exposed to the outside with the casing 4 opened as shown in FIG. 5, so that the user can read the received message displayed on the main display 47a. Subsequently the reply-message-preparation screen is displayed on the main display 47a by depressing again the message-display key 450 with the contents of the received message displayed on the main display 47a. The user then prepares the reply message by entering characters with the plurality of manipulation keys of the key input device 45. As a last step the prepared message-sending signals are transmitted to the communications equipment of the sender of the received message by depressing the message-sending key of the key input device 45. Accordingly the user can send the reply message to the sender of the received message.

With the portable telephone of the present embodiment, in the case where the simple mode for sending reply messages is set on, the reply-message-preparation screen will be displayed on the main display 47a by opening the casing 4 as described above when the message is received with the casing 4 closed. A series of manipulations for sending the reply message to the sender of the received message is made easier than that with the conventional portable telephone which requires the user to manipulate the reply-message-preparation key after opening the casing.

Furthermore, the user can read the received message with the casing 4 closed by merely manipulating the message-display key 450 as stated above. The manipulations for reading the received message are made easier than those with the conventional portable telephone which requires the user to open the casing for reading the received message.

The device of the present invention is not limited to the foregoing embodiments in construction but can be modified variously within the technical scope as set forth in the appended claims.

For example, although the contents of the received message are displayed when the message-display key is manipulated after the reception of the message in the first and the second embodiments, this is not limitative; but the contents of the received message are automatically displayed regardless of whether the user manipulates the key when a message is received.

Furthermore, the message prepared in conformity with the user's entering characters is sent to the sender of the received message when the message-sending key is depressed in the first and the second embodiments, but this is not limitative; in the case where the prepared message is to be sent to the other party than the sender of the received message, the prepared message is to be sent to the other party.

Figure 8:
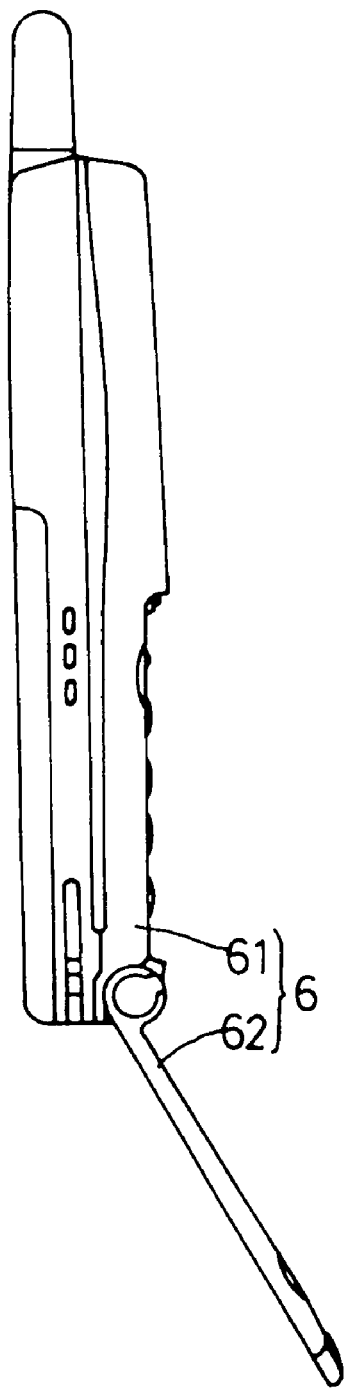
FIG. 8(a) is a side elevation of a portable telephone in its opened state, of the other embodiment.
FIG. 8(b) is a front view of the portable telephone in its opened state.
Figure 8:
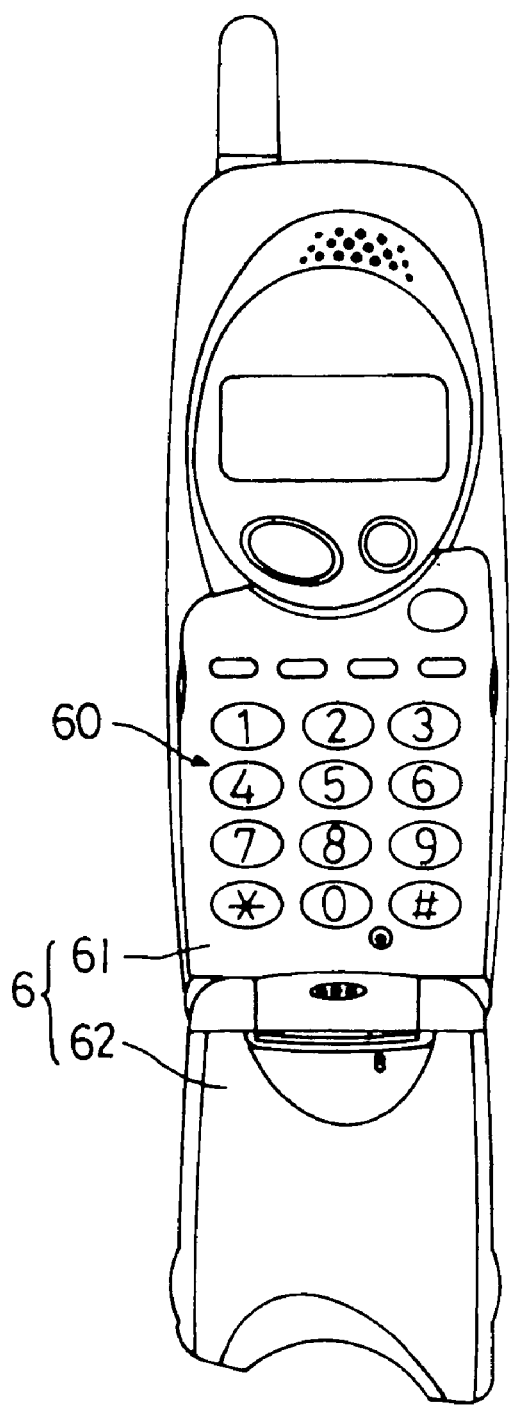
Figure 9:
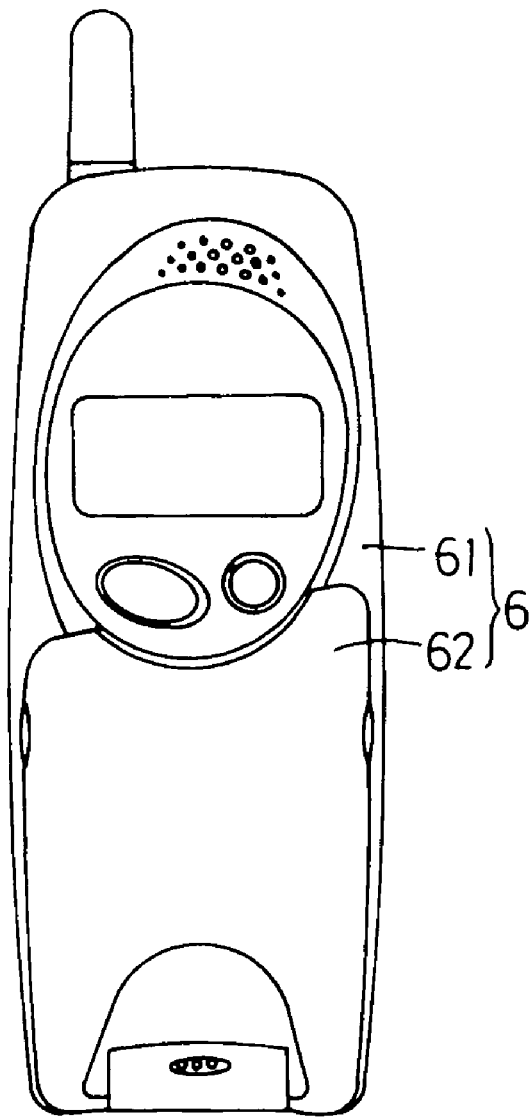
FIG. 9(a) is a front view of the portable telephone in its closed sate.
FIG. 9(b) is a side elevation of the portable telephone in its closed state.
Figure 9:
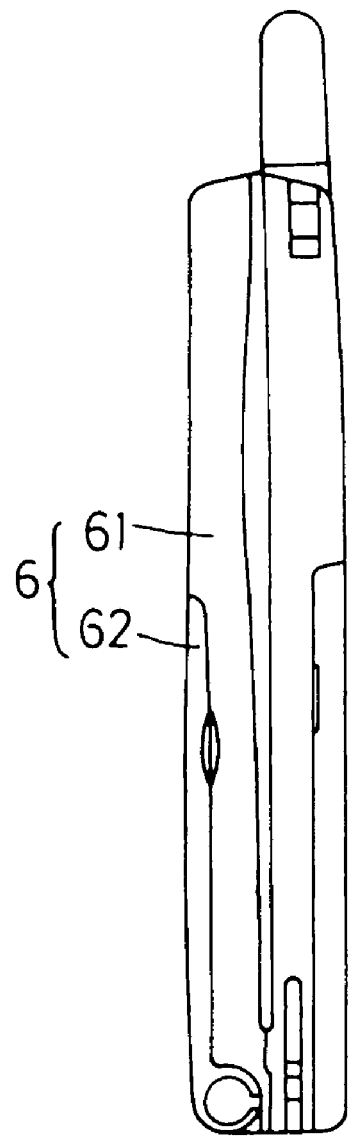

The present invention can be practiced not only for the portable telephones comprising a casing 6 including a main body case 61 and a lid 62 for covering only a key manipulation surface 60 which is arranged on a front surface of the main body case 61 as shown in FIGS. 8 and 9, but also for the other portable telephones such as a portable telephone comprising an openable/closable casing which is known.

What is claimed is:

1. A portable telephone including an openable/closable casing, a display having a screen which is exposed to the outside regardless of whether the casing is opened or closed, and a key input device having a plurality of manipulation keys for entering characters and a manipulation surface which is to be exposed to the outside by opening the casing, the portable telephone being capable of sending and receiving messages containing electronic information, the portable telephone being characterized in that the portable telephone comprises:

opening-closing detection means for detecting whether the casing is opened or closed, means for receiving the message, display control means for displaying the contents of the received message on the display when the message is received with the casing closed, and when the casing in an opening state is thereafter detected, displaying on the display, in response to the detection of the opening state, a message-preparation screen for preparing a message to be sent to a sender of the received message or to the other party than the sender.

2. A portable telephone according to claim 1 wherein the portable telephone comprises a message-display key which is positioned so as to be manipulated with the casing closed, and the display control means executes a display operation for displaying the contents of the received message when the message-display key is manipulated after the message is received.

3. A portable telephone according to claim 2 wherein, when the message-display key is manipulated after the message is received with the casing opened, the display control means displays the contents of the received message on the display and then displays the message-preparation screen on the display when the message-display key is further manipulated.

4. A portable telephone including an openable/closable casing, a main display having a screen which is to be exposed to the outside by opening the casing, an auxiliary display having a screen which is to be exposed to the outside with the casing closed, and a key input device having a manipulation surface which is to be exposed to the outside by opening the casing, the portable telephone being capable of sending and receiving messages containing electronic information, the portable telephone being characterized in that the portable telephone comprises:

opening-closing detection means for detecting whether the casing is opened or closed, means for receiving the message, display control means for displaying the contents of the received message on the auxiliary display when the message is received with the casing closed, and when the casing in an opening state is thereafter detected, displaying on the main display, in response to the detection of the opening state, a message-preparation screen for preparing a message to be sent to a sender of the received message or to the other party than the sender.

5. A portable telephone according to claim 4 wherein the portable telephone comprises a message-display key which is positioned so as to be manipulated with the casing closed, and the display control means executes a display operation for displaying the contents of the received message when the message-display key is manipulated after the message is received.

6. A portable telephone according to claim 5 wherein, when the message-display key is manipulated after the message is received with the casing opened, the display control means displays the contents of the received message on the main display and then displays the message-preparation screen on the main display when the message-display key is further manipulated.

* * * * *